United States Patent
Ota et al.

(10) Patent No.: US 9,939,943 B2
(45) Date of Patent: *Apr. 10, 2018

(54) DISPLAY APPARATUS, DISPLAY SYSTEM, AND DISPLAY METHOD

(71) Applicant: SEIKO EPSON CORPORATION, Tokyo (JP)

(72) Inventors: Koichiro Ota, Omachi (JP); Kazuyoshi Kitabayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,244

(22) Filed: Oct. 6, 2016

(65) Prior Publication Data

US 2017/0052621 A1 Feb. 23, 2017

Related U.S. Application Data

(63) Continuation of application No. 14/550,315, filed on Nov. 21, 2014, now Pat. No. 9,489,075.

(30) Foreign Application Priority Data

Jan. 16, 2014 (JP) ................................ 2014-005751

(51) Int. Cl.
*G06F 3/041* (2006.01)
*G06F 9/44* (2018.01)
(Continued)

(52) U.S. Cl.
CPC .............. *G06F 3/0412* (2013.01); *G06F 3/14* (2013.01); *G06F 9/4445* (2013.01);
(Continued)

(58) Field of Classification Search
CPC ........ G06F 3/0412; G06F 3/14; G06F 3/1454; G06F 9/4445; G06F 1/1647;
(Continued)

(56) References Cited

U.S. PATENT DOCUMENTS

| | | |
|---|---|---|
| 5,818,436 A | 12/1998 | Sartorius et al. |
| 6,144,991 A | 11/2000 | England |

(Continued)

FOREIGN PATENT DOCUMENTS

| | | |
|---|---|---|
| JP | H06-343146 A | 12/1994 |
| JP | 2009-093219 A | 4/2009 |

(Continued)

OTHER PUBLICATIONS

Jun. 10, 2015 Extended European Search Report issued in Application No. 15150871.0.

(Continued)

*Primary Examiner* — Tom Sheng
(74) *Attorney, Agent, or Firm* — Oliff PLC

(57) ABSTRACT

A client can return a display state of an object to the past. When a point body moves on a screen, a projector draws an object of a line representing a moving trajectory. The projector generates object data representing the object and transmits the generated object data to tablet terminals. The object data contains order information representing generation order of the object. The tablet terminals display the object represented by the transmitted object data on a touch panel. When performing an operation for returning the display, the tablet terminals return the display by object unit based on the order information contained in the object data.

12 Claims, 10 Drawing Sheets

(51) Int. Cl.
    *G06Q 10/10*     (2012.01)
    *H04L 12/18*     (2006.01)
    *H04M 3/56*     (2006.01)
    *H04L 12/58*     (2006.01)
    *G06F 3/14*     (2006.01)

(52) U.S. Cl.
    CPC ....... *G06Q 10/101* (2013.01); *H04L 12/1813* (2013.01); *H04L 12/1827* (2013.01); *H04L 51/10* (2013.01); *H04M 3/567* (2013.01)

(58) Field of Classification Search
    CPC ............... H04L 65/403; H04L 65/4038; H04L 65/4046; H04L 65/4053; H04L 12/1813; H04L 12/1827; H04L 51/10; G06Q 10/101; H04M 3/567
    See application file for complete search history.

(56) References Cited

U.S. PATENT DOCUMENTS

| | | | | |
|---|---|---|---|---|
| 6,163,796 | A * | 12/2000 | Yokomizo | H04L 29/06027 709/203 |
| 6,728,784 | B1 | 4/2004 | Mattaway | |
| 7,043,529 | B1 | 5/2006 | Simonoff | |
| 9,116,652 | B2 * | 8/2015 | Yun | G06F 3/1438 |
| 9,489,075 | B2 * | 11/2016 | Ota | G06F 3/0412 |
| 2002/0133611 | A1 * | 9/2002 | Gorsuch | H04L 12/1822 709/231 |
| 2006/0158439 | A1 * | 7/2006 | Luo | G06F 1/1605 345/173 |
| 2009/0049195 | A1 * | 2/2009 | Ping Yang | G06Q 50/12 709/244 |
| 2009/0094534 | A1 | 4/2009 | Murai | |
| 2010/0262669 | A1 * | 10/2010 | Ono | H04M 3/56 709/206 |
| 2010/0328469 | A1 * | 12/2010 | Hashimoto | G06F 3/1454 348/207.1 |
| 2011/0066971 | A1 * | 3/2011 | Forutanpour | G06F 9/4443 715/788 |
| 2012/0154511 | A1 * | 6/2012 | Hsu | G06F 3/03545 348/14.03 |
| 2012/0242571 | A1 * | 9/2012 | Takamura | G09G 5/36 345/156 |
| 2014/0164852 | A1 * | 6/2014 | Sumiyoshi | H04N 7/155 714/57 |
| 2014/0267077 | A1 * | 9/2014 | Qaddoura | G06F 3/041 345/173 |
| 2015/0095805 | A1 * | 4/2015 | Shibayama | G06F 3/04883 715/753 |

FOREIGN PATENT DOCUMENTS

| | | |
|---|---|---|
| JP | 2010-165152 A | 7/2010 |
| JP | 2013-65125 A | 4/2013 |

OTHER PUBLICATIONS

Feb. 1, 2016 Office Action Issued in U.S. Appl. No. 14/550,315.
Jul. 8, 2016 Notice of Allowance Issued in U.S. Appl. No. 14/550,315.

* cited by examiner

DISPLAY APPARATUS, DISPLAY SYSTEM, AND DISPLAY METHOD

CROSS-REFERENCE TO RELATED APPLICATION

This application is a Continuation of U.S. patent application Ser. No. 14/550,315, filed Nov. 21, 2014, which claims priority to Japanese Patent Application No. 2014-005751, filed Jan. 16, 2014. Both of the above applications are expressly incorporated by reference herein.

BACKGROUND

1. Technical Field

The present invention relates to a display apparatus, a display system, and a display method.

2. Related Art

A system sharing a screen with a plurality of remote conference clients is disclosed in JP-A-2013-65125. Data of drawing objects displayed in this system is transmitted from a remote conference server to the plurality of remote conference clients on an object by object basis. Each remote conference client saves the data of the drawing object including various types of attribute information (color, position, thickness, and the like) and displays the drawing object on a display based on the stored data.

When the conference is processed while sharing the screen, a case where it is desired for the display to be returned to a past time point may occur but there is no mechanism to return the drawing object to a display state of the past and the display state of the past cannot be reproduced in the system of JP-A-2013-65125.

SUMMARY

An advantage of some aspects of the invention is to make a display state of an object be gone back to the past state in a client.

An aspect of the invention is directed to a display apparatus including: a display unit that displays a picture; an obtaining unit that obtains coordinates on a display region of the display unit; an object display unit that displays an object in a position of the coordinates obtained by the obtaining unit; a generating unit that generates object data including order information that is data representing the order in which the object is generated; and a script transmitting unit that transmits a script for obtaining the object data to a client.

According to the aspect of the invention, the display state of the object can go back to the past by performing the display based on the object data so as to display the object to the order specified by the user in the client.

The display apparatus according to the aspect of the invention may further include: a second object data receiving unit that receives second object data that is generated and transmitted by a client, and a second object display unit that displays the received second object data, the generating unit may generate third object data in which the order information is added to the received second object data, and the script transmitting unit may transmit the script to obtain the object data including the third object data.

With this configuration, it is possible to display the object data generated by a client terminal and to share the display of the same object between the display apparatus and the client.

The display apparatus according to the aspect of the invention may further include a receiving unit that receives the order information transmitted by the client and a data transmitting unit that transmits the object data generated by the generating unit to the client, and the data transmitting unit may transmit to the client the object data ranging from the object data generated first through the object data corresponding to the order represented in the order information received by the receiving unit.

With this configuration, since data other than the object data corresponding to or preceding the specified order information is not transmitted to the client, it is possible to reduce communication quantity.

In the display apparatus according to the aspect of the invention, the receiving unit may receive the order information specified in a slider type user interface displayed on a display unit of the client.

Also in this configuration, since data other than the object data corresponding to or preceding the specified order information is not transmitted to the client, it is possible to reduce communication quantity.

In the display apparatus according to the aspect of the invention, the receiving unit may receive the order information included in the object specified by a user among the objects corresponding to the object data which are transmitted by the data transmitting unit and displayed on the display unit of the client.

Also in this configuration, since data other than the object data corresponding to or preceding the specified order information is not transmitted to the client, it is possible to reduce communication quantity.

The display apparatus according to the aspect of the invention may further include a voice data generating unit that generates voice data representing received voice, and the data transmitting unit may transmit to the client the voice data subsequent to a time point at which the object data corresponding to the order represented by the order information obtained by the receiving unit is generated among the voice data.

With this configuration, it is possible to reproduce the voice at the time of the display state of the past object.

Another aspect of the invention is directed to a display system including: a display apparatus; and a client. The display apparatus includes a display unit that displays a picture, an obtaining unit that obtains coordinates on a display region of the display unit, an object display unit that displays an object in a position of the coordinates obtained by the obtaining unit, a generating unit that generates object data including order information that is data representing the order in which the object is generated, a data transmitting unit that transmits the object data generated by the generating unit to the client, and a script transmitting unit that transmits a script for obtaining the object data to the client. The client includes a script receiving unit that receives the script, a script execution unit that executes the script, a data receiving unit that receives the object data, and a display control unit that controls a display unit included in the client based on the object data so as to display the object to the order specified by a user.

According to the aspect of the invention, the display state of the object can go back to the past by performing the display based on the object data so as to display the object to the order specified by the user in the client.

Still another aspect of the invention is directed to a display method including: displaying an object in a display region of a display unit; generating object data including order information that is data representing the order in which the object is generated; transmitting object data generated by the generating of object data to the client; transmitting a script for obtaining the object data to the client; receiving the script; executing the script; receiving the object data; and controlling the display unit included in its own apparatus based on the object data so as to display the object to the order specified by a user.

According to the aspect of the invention, the display state of the object can go back to the past by performing the display based on the object data so as to display the object to the order specified by the user in the client.

BRIEF DESCRIPTION OF THE DRAWINGS

The invention will be described with reference to the accompanying drawings, wherein like numbers reference like elements.

DESCRIPTION OF EXEMPLARY EMBODIMENTS (First Embodiment) Entire Configuration

Figure 1:
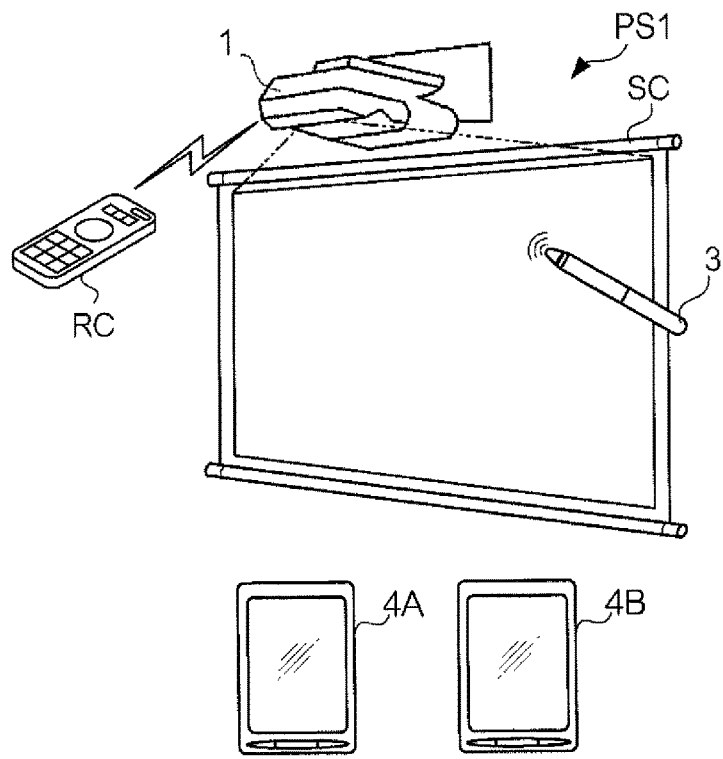
FIG. 1 is a view illustrating an entire configuration of a display system.

FIG. 1 is a view illustrating an entire configuration of a display system PS1 according to an embodiment of the invention. The display system PS1 has a projector 1, a point body 3, tablet terminals 4A and 4B having touch panels, a controller RC, and a screen SC. The projector 1 and the tablet terminals 4A and 43 are connected through a wireless Local Area Network (LAN). Since configurations of the tablet terminal 4A and the tablet terminal 4B are the same as each other, hereinafter, the tablet terminal refers to a tablet terminal 4 if it is not necessary to distinguish the tablet terminals from each other.

The projector 1 that is an example of a display apparatus according to the invention is an apparatus to project a picture represented by a picture signal supplied from an external device (for example, personal computer) on the flat screen SC. The projector 1 is a front projection type short focus projector and is disposed at a position relatively close to the screen SC. In the example of FIG. 1, the projector 1 is disposed above the screen SC. The projector 1 according to the embodiment has a whiteboard function, detects a position of the point body 3, and projects a picture representing a moving trajectory of the point body 3 on the screen SC, when the point body 3 is moved on a surface of the screen SC. A user can draw an object (for example, line, character, diagram, and the like) on the screen SC by the function so as to perform writing on the whiteboard with a pen.

The point body 3 is a pen type or a rod type device used as a writing material when the user draws the object on the screen SC. The controller RC is a remote controller for controlling the projector 1 by wireless communication (for example, infrared communication).

The tablet terminal 4 is an example of a terminal device displaying a picture projected on the screen SC. When the user draws the object using the point body 3 by the whiteboard function of the projector 1, the projector 1 and the tablet terminal 4 perform the communication through a wireless LAN and the same picture as the picture projected on the screen SC is displayed on the tablet terminal 4. When the user moves a stylus pen or a finger on a touch panel, the tablet terminal 4 detects the position of the stylus pen or the finger and displays the picture representing a moving trajectory of the stylus pen or the finger. Thus, it is possible to write the object on the displayed picture in the tablet terminal 4. Furthermore, when drawing the object with the stylus pen or the finger on the picture displayed on the tablet terminal 4, the tablet terminal 4 performs communication with the projector 1 and the picture of the object drawn on the tablet terminal 4 is projected on the screen SC.

Configuration of Point Body 3

Figure 2:
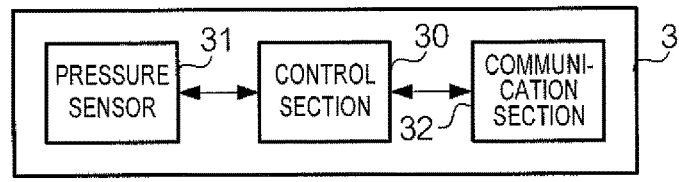
FIG. 2 is a view illustrating a hardware configuration of a point body.

FIG. 2 is a block view illustrating a hardware configuration of the point body 3. The point body 3 has a control section 30, a pressure sensor 31, and a communication section 32. The pressure sensor 31 is provided in a leading end of the point body 3, detects a pressure applied to the leading end of the point body 3, and supplies a signal representing the detected pressure to the control section 30. The control section 30 controls the communication section 32 in response to the signal supplied from the pressure sensor 31. The communication section 32 has a Light Emitting Diode (LED) emitting a light having a predetermined wavelength. When the signal supplied from the pressure sensor 31 exceeds a predetermined threshold value, the control section 30 controls the communication section 32 such that the LED emits light. Furthermore, when the pressure represented by the signal supplied from the pressure sensor 31 is the predetermined threshold value or less, the control section 30 controls the communication section 32 such that the LED goes off.

Configuration of Tablet Terminal 4

Figure 3:
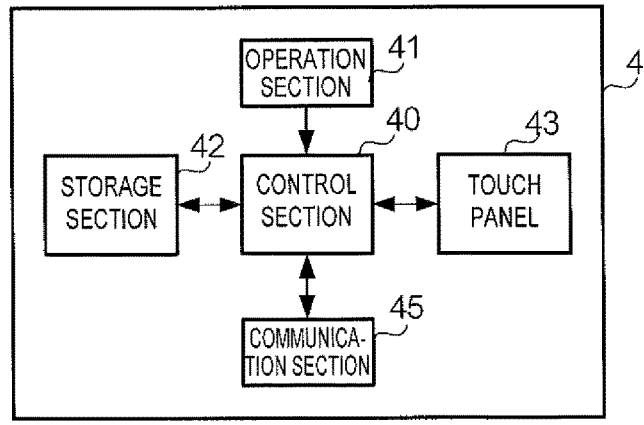
FIG. 3 is a view illustrating the hardware configuration of a tablet terminal.

FIG. 3 is a block view illustrating the hardware configuration of the tablet terminal 4.

A control section 40 includes a Central Processing Unit (CPU) or a Random Access Memory (RAM), and a non-volatile memory, and when the CPU executes a program stored in the nonvolatile memory, an operation system of the tablet terminal 4 is operated and, in addition, an application program can be executed.

A touch panel 43 is a touch panel in which the display apparatus (for example, liquid crystal display) and an electrostatic capacitance type position input device detecting the position with which the user comes into contact on the display apparatus are integrally formed. An operation section 41 includes buttons for operating the tablet terminal 4. A communication section 45 is a communication interface performing wireless communication through the wireless LAN.

A storage section 42 has a nonvolatile memory and stores various application programs or data that is used by the application programs. The storage section 42 stores a program realizing a Web browser and when the CPU executes the program, the Web browser is realized in the tablet terminal 4. Moreover, the Web browser realized in the tablet terminal 4 can interpret a script language and executes the script obtained from the projector 1. Thus, a function for displaying the picture projected on the screen SC, a function for writing the object on the picture displayed in the Web browser, a function for editing the object displayed in the Web browser, or the like is realized.

Figure 4:
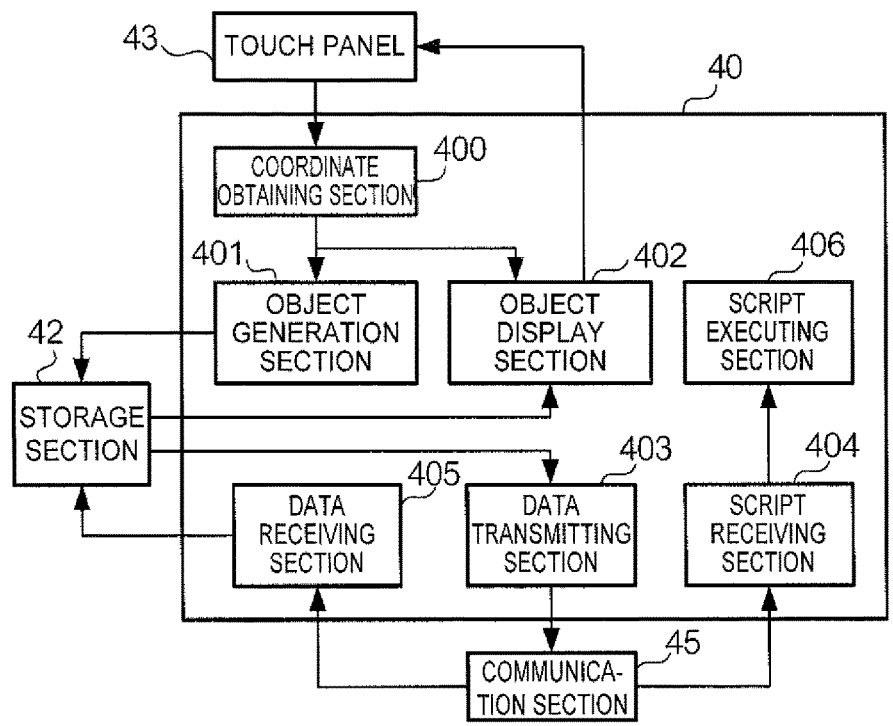
FIG. 4 is a view illustrating a configuration of functions realized in the tablet terminal.

FIG. 4 is a block view illustrating a configuration of functions according to the invention in the functions realized in the tablet terminal 4. A coordinate obtaining section 400 functions as an obtaining unit that obtains a position (coordinate) with which the stylus pen or the finger that is the point body comes into contact on the touch panel 43.

An object generation section 401 functions as a generation unit that generates object data of the object displayed at a position obtained by the coordinate obtaining section 400. An object display section 402 functions as a display control unit that controls the touch panel 43 so as to display the object at a position obtained by the coordinate obtaining section 400. Furthermore, the object display section 402 controls the touch panel 43 so as to display the object represented by the object data transmitted from the projector 1.

A data transmitting section 403 functions as a data transmitting unit that transmits various kinds of data to the projector 1. A script receiving section 404 receives a Web page transmitted from the projector 1. The script is contained in the Web page and the script receiving section 404 functions as the script receiving unit. A data receiving section 405 functions as a receiving unit that receives the object data transmitted from the projector 1. A script executing section 406 functions as a script execution unit that executes the script received in the script receiving section 404.

Configuration of Projector 1

Figure 5:
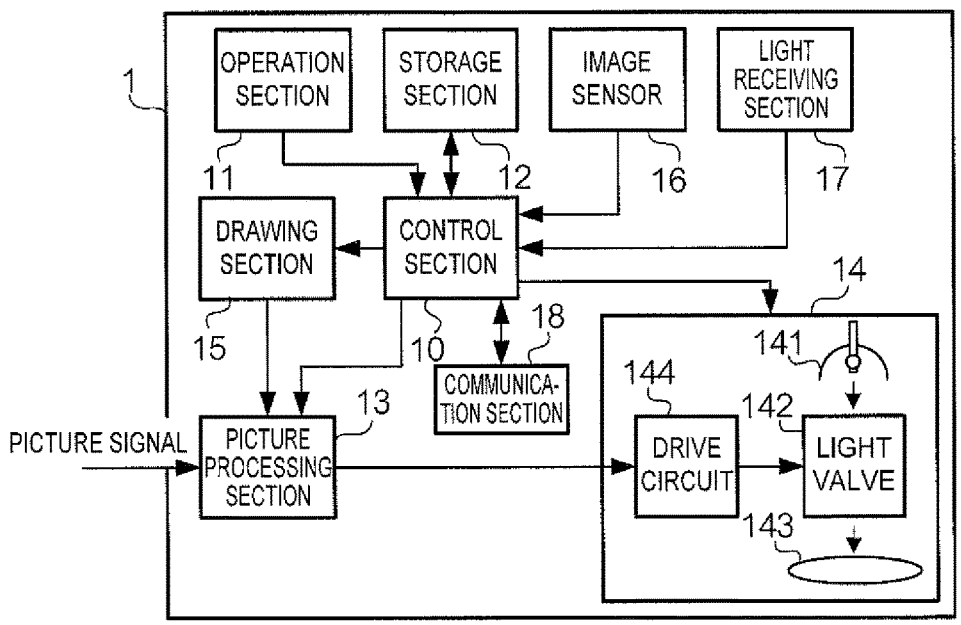
FIG. 5 is a view illustrating a hardware configuration of a projector.

FIG. 5 is a block view illustrating a hardware configuration of the projector 1. An image sensor 16 is a solid state imaging device that images the screen SC and generates image data, and, for example, is a CMOS imaging sensor or a CCD imaging sensor. A light receiving section 17 obtains an infrared signal transmitted from the controller RC and supplies an electric signal representing the obtained infrared signal to a control section 10. A communication section 18 is a communication interface performing the wireless communication through the wireless LAN.

An operation section 11 includes a plurality of buttons for operating the projector 1. The control section 10 controls each section according to the operated button. Thus, it is possible to adjust the picture projected on the screen SC and to perform setting and the like of various functions included in the projector 1.

A drawing section 15 is controlled by the control section 10, generates a menu image for performing setting of various functions of the projector 1, a menu image for adjusting the picture displayed by the projector 1, an image representing the object, or the like, and supplies the signal representing the generated image to a picture processing section 13.

The picture processing section 13 obtains a picture signal supplied from an external device or a signal supplied from the drawing section 15. The picture processing section 13 includes a plurality of picture processing functions and performs various processes with respect to the supplied picture signal. For example, the picture processing section 13 is controlled by the control section 10 and performs an adjusting process of an image quality such as adjustment of brightness, contrast, depth of color, tint, and color temperature of the picture projected on the screen SC. Furthermore, the picture processing section 13 supplies the picture signal obtained by overlapping the signal supplied from the drawing section 15 on the picture signal to the display section 14.

A display section 14 has a light source 141, a light valve 142, a drive circuit 144, and a projection lens 143, and is an example of a display unit displaying the picture. The light source is a lamp emitting the light, the light emitted by the light source is split into red, green, and blue lights by a plurality of dichroic mirrors (not illustrated), and the split red, green, and blue lights are guided to the light valve 142 by a mirror (not illustrated).

The drive circuit 144 obtains the picture signal supplied from the picture processing section 13. The picture signal supplied in the drive circuit 144 has tone data that represents a tone for a red component in the picture to be projected, tone data that represents a tone for a green component in the picture to be projected, and tone data that represents a tone for a blue component in the picture to be projected. The drive circuit 144 obtains the tone data of each color of red, green, and blue, and drives the light valve 142 based on the obtained tone data of each color.

The light valve 142 has a liquid crystal light valve on which the red light is incident, a liquid crystal light valve on which the green light is incident, and a liquid crystal light valve on which the blue light is incident. The liquid crystal light valve is a transmissive liquid crystal panel and includes pixels disposed in a matrix shape in a plurality of rows and a plurality of columns. The liquid crystal light valve on which the red light is incident is driven based on the tone data of red, the liquid crystal light valve on which the green light is incident is driven based on the tone data of green, and the liquid crystal light valve on which the blue light is incident is driven based on the tone data of blue. In each liquid crystal light valve, each pixel is controlled and transmittance of the pixel is changed by the drive circuit 144. The transmittance of the pixel is controlled and thereby the light of each color which transmitted the liquid crystal light valve becomes a picture corresponding to each tone data. The pictures of the red, green, and blue lights which transmitted the liquid crystal light valve are combined by a dichroic prism (not illustrated) and are incident on the projection lens 143. The projection lens 143 is a lens enlarging the incident picture and enlarges the incident picture and projects the picture on the screen SC.

The control section 10 includes a CPU, a RAM, and a nonvolatile memory and when the CPU executes the program stored in the nonvolatile memory, a function for projecting the picture representing the picture signal input from the external device on the screen, a function for adjusting an aspect ratio of the picture to be projected, a function for adjusting the image quality of the picture to be projected, a function for drawing or editing the object depending on the operation of the point body 3, a function for displaying the object drawn in the tablet terminal 4, and the like are realized in the projector 1. Furthermore, when the control section 10 executes the program stored in the nonvolatile memory, the projector 1 functions as a server of a client server system and a function for performing the communication with the tablet terminal 4 that is the client is realized. Moreover, when the projector 1 is operated as a server, a function referred to as a so-called Comet is realized in which a response is suspended when a request is received from the client, and suspension of the response is released when an event is generated in the projector 1, and the response is returned to the client that transmits the request.

A storage section 12 has a nonvolatile memory. The storage section 12 stores a user identifier and a password uniquely identifying the user as information for authenticating the user of the projector 1.

Furthermore, the storage section 12 stores data related to the picture displayed in the whiteboard function. The data of the picture displayed in the whiteboard function is stored as the Web page and contains a script realizing a function for writing the object, a function for editing the object, and the like, and object data representing the object contained in the picture to be displayed. The object data contains information for drawing the object and, for example, if the object is a line, contains data of a color of the line, a thickness of the line, coordinates of the line, and the like. Furthermore, the object data contains order information representing the order generated by the object. For example, when a circle is drawn by the point body 3, after the line is initially drawn by the point body 3, the object data of the line contains "1" of the order information representing that it is generated first and the object data of the circle contains "2" of the order information representing that it is generated second.

Furthermore, the object data may contain data related to the editing. For example, after the drawing of the circle is performed, when an operation removing the line drawn by the first operation is performed, the object data representing the removal of the object is generated, as the third operation. The object data related to the removal contains "1" as the order information of the object to be removed when removing the line drawn first and contains "3" as the order information representing that the object data is generated third in the order in which the object data is generated.

Figure 6:
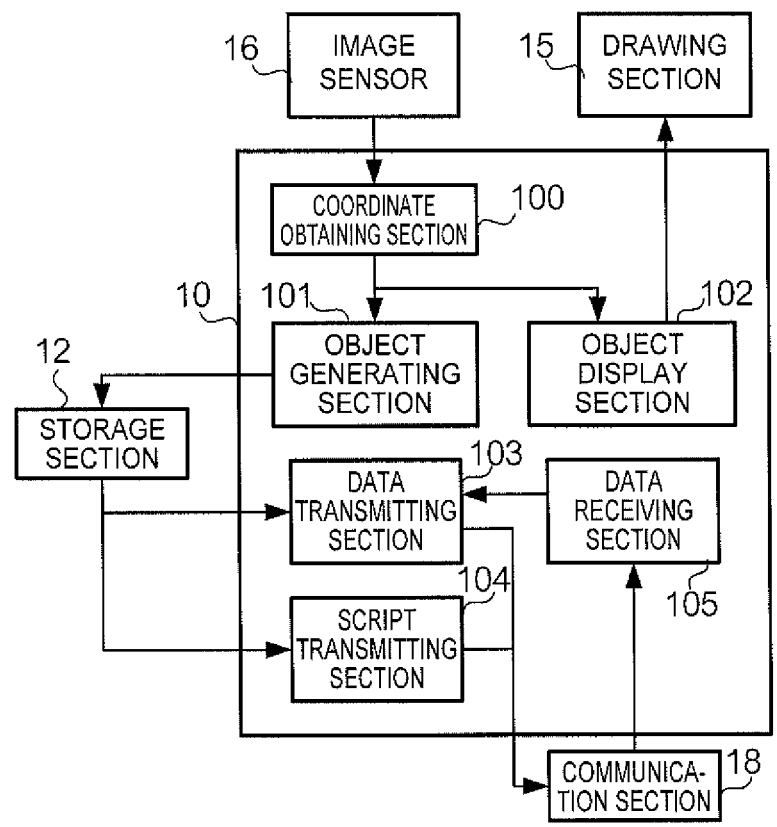
FIG. 6 is a view illustrating a configuration of a function realized in the projector.

FIG. 6 is a block view illustrating a configuration of a function according to the invention in the functions realized in the projector 1. A coordinate obtaining section 100 functions as an obtaining unit that obtains the position (coordinate) of the point body 3 by interpreting the image data supplied from the image sensor 16. An object generating section 101 functions as a generating unit that generates the object data of the object displayed in the position of the point body 3 obtained by the coordinate obtaining section 100. An object display section 102 functions as an object display unit that controls the drawing section 15 so as to display the object in the position obtained by the coordinate obtaining section 100. A data transmitting section 103 functions as a data transmitting unit that transmits the object data to the tablet terminal 4. A script transmitting section 104 transmits the Web page to the tablet terminal 4. Since the Web page contains the script, the script transmitting section 104 functions as a script transmitting unit. A data receiving section 105 functions as a receiving unit that receives various types of information transmitted from the tablet terminal 4.

Operation Example of Embodiment

Figure 7:
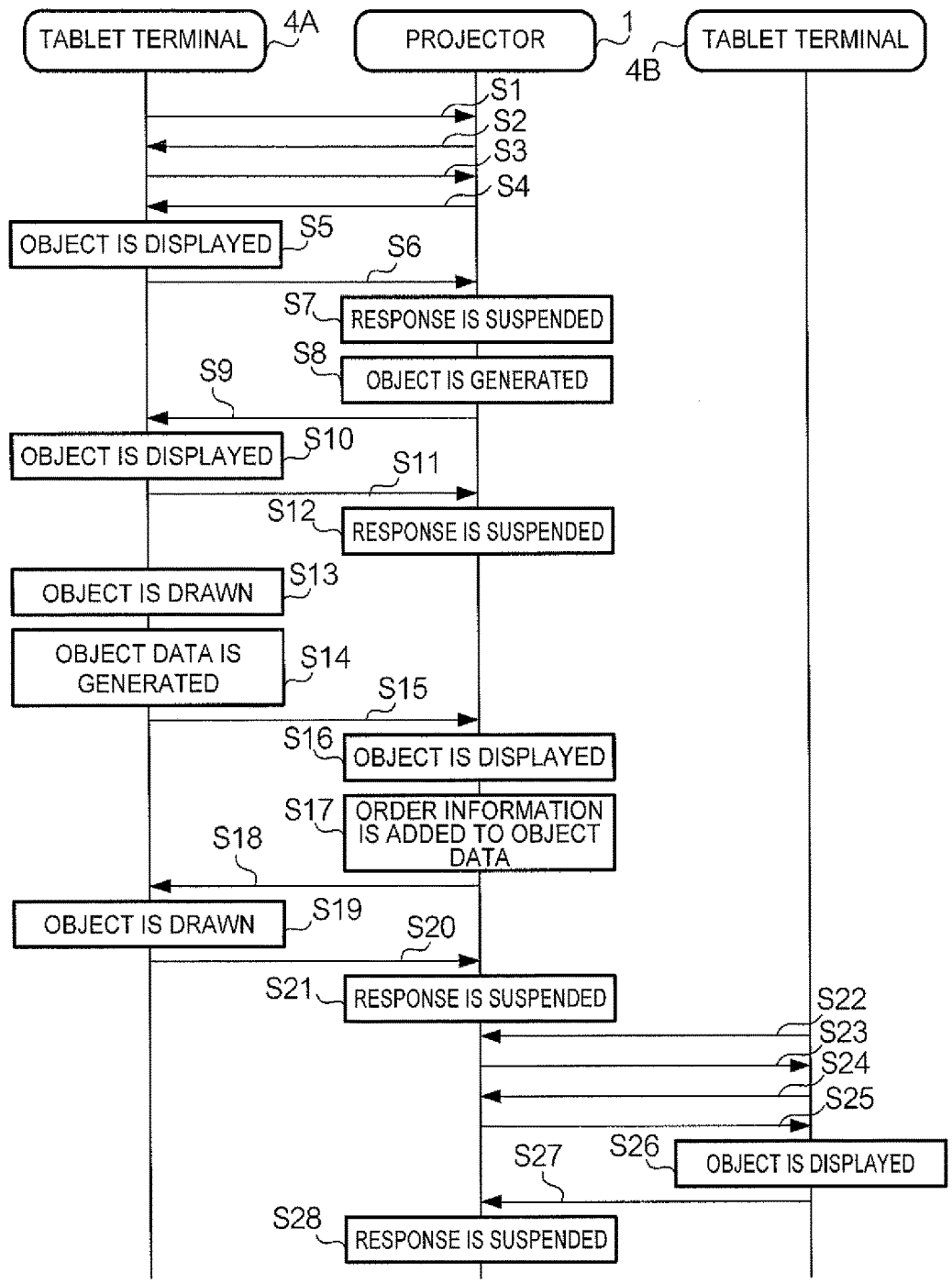
FIG. 7 is a view describing an operation of an embodiment.
Figure 8:
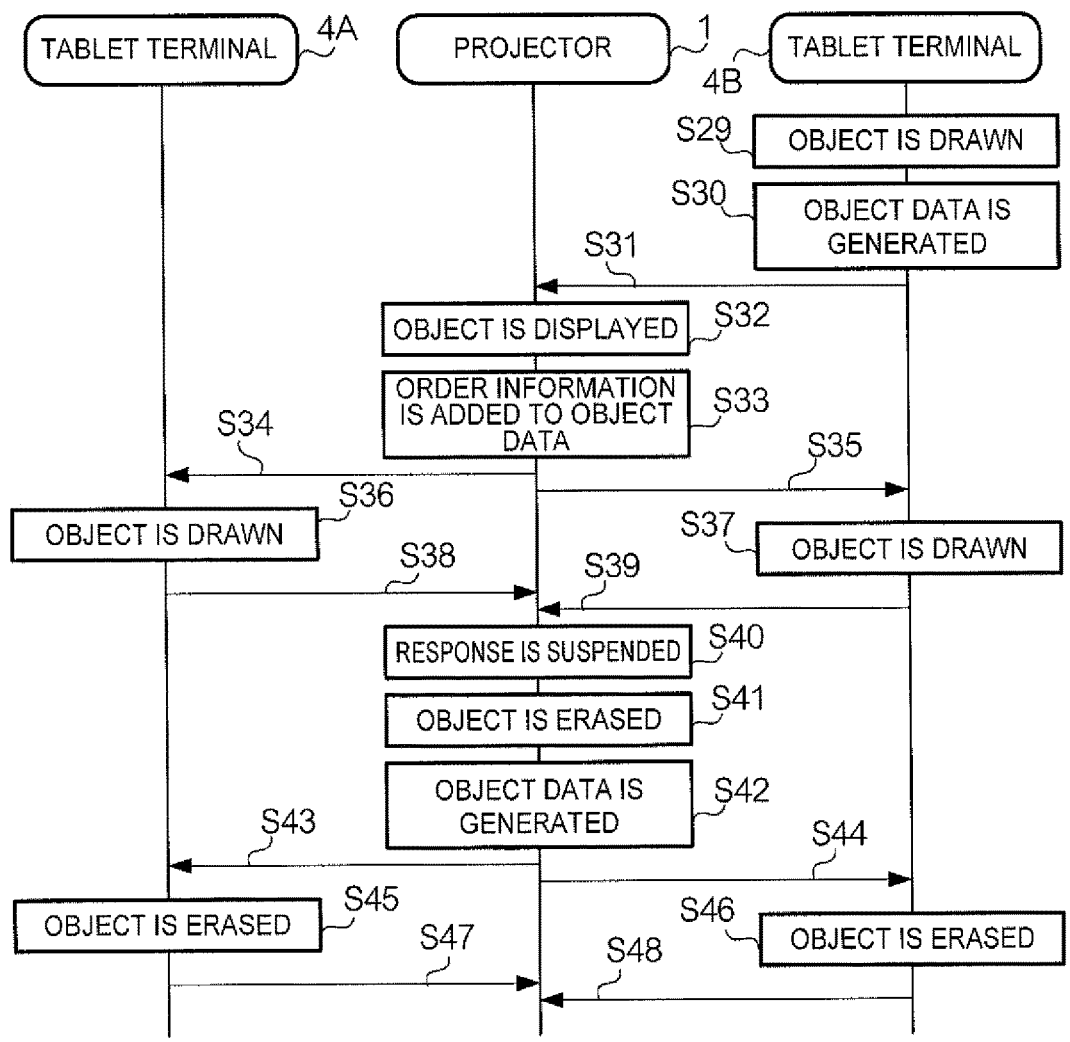
FIG. 8 is a view describing an operation of an embodiment.

Next, an operation example of the embodiment will be described with reference to FIGS. 7 to 16. Moreover, FIGS. 7 and 8 are sequence views describing the operation of the embodiment and FIGS. 9 to 16 are views illustrating picture examples to be displayed.

Operation Example when Object is Generated in Projector 1

Figure 9:
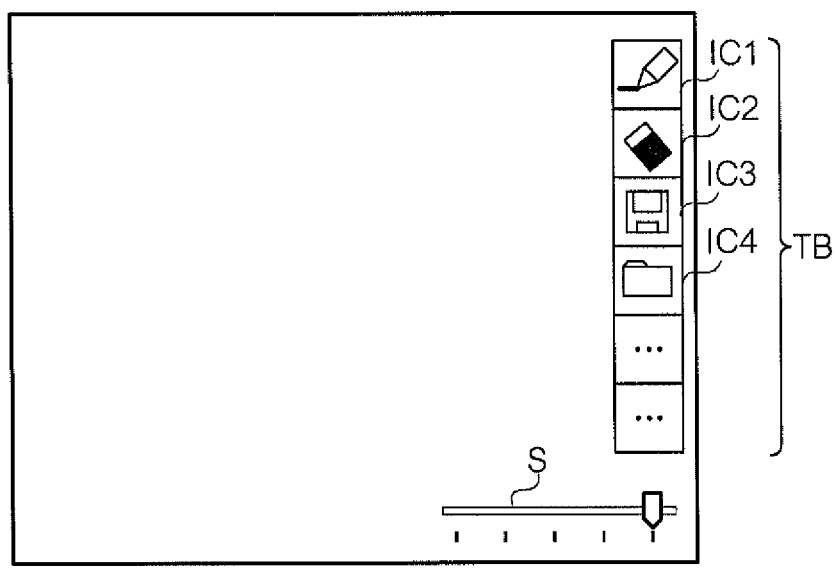
FIG. 9 is a view illustrating a picture example projected on a screen.

When the user performs an operation to instruct start of the whiteboard function in the controller RC, the picture illustrated in FIG. 9 is displayed by the projector 1 on the screen SC. Here, a toolbar TB representing the function that can be used in the whiteboard function is displayed in the screen SC. An icon IC1 representing a function to draw the line, an icon IC2 representing a function to erase the object, an icon IC3 representing a function to save a drawing content as a page, and an icon IC4 representing a function to display the saved page, and the like are in the toolbar TB.

Furthermore, a slider S is displayed in the screen SC. The slider S is a tool that can be used to return or advance the display of the object on a time axis. A left end of the slider S represents a time point at which an initial object is generated and a right end of the slider S represents a time point at which the latest object is generated. When a knob of the slider S is operated to be shifted to the left by one step, a state of an operation that is performed just before is displayed and when the knob of the slider S is operated to be shifted to the right by one step, a state of an operation that is operated just after is displayed.

Figure 10:
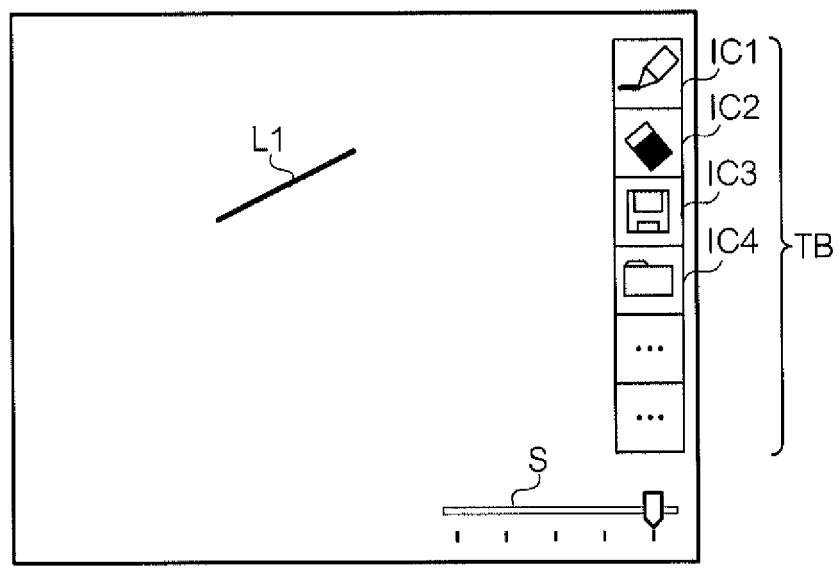
FIG. 10 is a view illustrating a picture example projected on a screen.

In a state where the picture illustrated in FIG. 9 is displayed, the user touches the position of the icon IC1 with the point body 3, the projector 1 is in a state of displaying the picture of a moving trajectory of the point body 3. When the user moves the point body 3 while coming into contact with the screen SC, the image sensor 16 acquires the light emitted by the point body 3. The control section 10 (coordinate obtaining section 100) analyzes the image data supplied from the image sensor 16, obtains the position of the light emitted by the point body 3, and specifies the moving trajectory of the point body 3 on the screen SC. When the control section 10 (object display section 102) controls the drawing section 15 based on the specified moving trajectory, as illustrated in FIG. 10, a line L1 is displayed in a position in which the point body 3 moves on the screen SC. The control section 10 (object generating section 101) generates the object data representing the displayed line L1 when detecting that the point body 3 is separated from the screen SC. Here, since the line L1 is the object that is generated first, the order information contained in the object data becomes "1".

Figure 11:
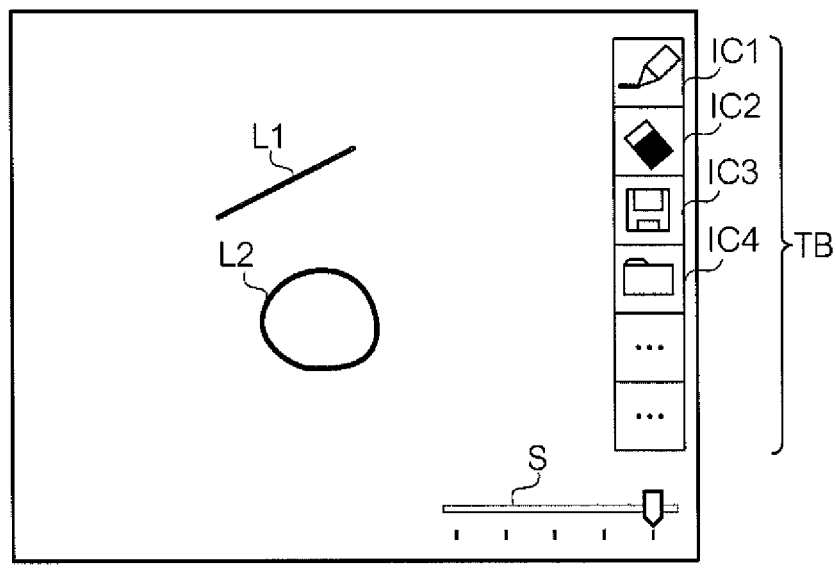
FIG. 11 is a view illustrating a picture example projected on a screen.
Figure 12:
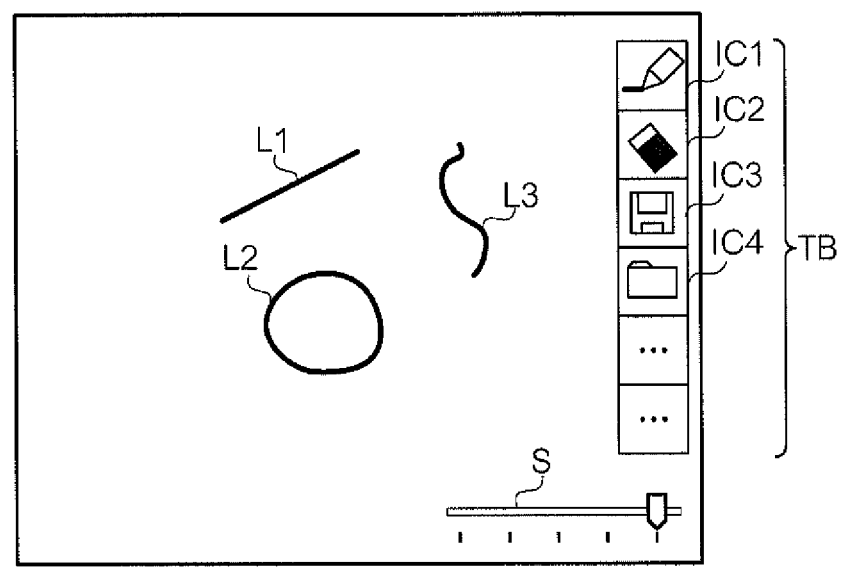
FIG. 12 is a view illustrating a picture example projected on a screen.
Figure 13:
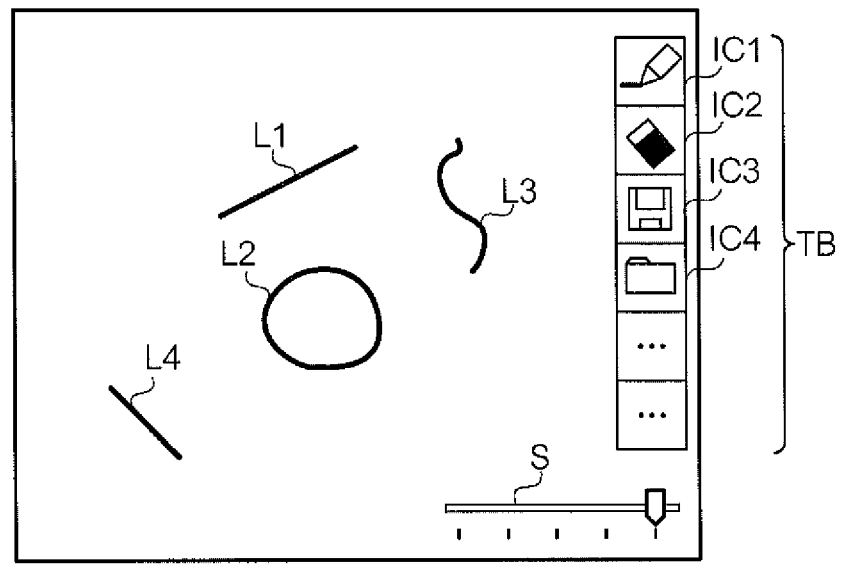
FIG. 13 is a view illustrating a picture example projected on a screen.

Furthermore, when the user moves the point body 3 while coming into contact with the screen SC so as to draw a circle, as illustrated in FIG. 11, a line L2 is displayed in a position in which the point body 3 moves on the screen SC. Here, since the line L2 is the object that is generated second, the order information contained in the object data that is generated becomes "2".

Operation Example when Tablet Terminal 4A is Logged in

Next, an operation example when the picture projected on the screen SC is displayed in the tablet terminal 4 will be described with reference to FIGS. 7 and 8. In the tablet terminal 4A in which the program of the Web browser is executed, when the user performs an operation to access the projector 1 on the touch panel 43, the tablet terminal 4A and the projector 1 communicate with each other and a page for logging in to the projector 1 is displayed on the touch panel 43. When the user inputs the user identifier and the password in the displayed page and performs an operation transmitting the user identifier and the password to the projector 1, the control section 40 transmits the input user identifier and the password to the projector 1 by controlling the communication section 45 (step S1). When the communication section 18 receives the transmitted identifier and the password, the control section 10 (script transmitting section 104) controls the communication section 18 and transmits the data of the Web page of the projected picture to the tablet terminal 4A when a set of the received user identifier and the password is stored in the storage section 12 (step S2).

When the communication section 45 receives the data of the Web page transmitted by the projector 1, the control section 40 (script receiving section 404 and script executing section 406) of the tablet terminal 4A executes the script contained in the Web page. The control section 40 (data transmitting section 403) transmits a message requesting the object data of all objects according to the Web page to the projector 1 by controlling the communication section 45 (step S3). When the communication section 18 receives the message, the control section 10 (data transmitting section 103) transmits the object data of the line L1 and the object data of the line L2 that are displayed to the tablet terminal 4A by controlling the communication section 18 (step S4).

When the communication section 45 receives the object data transmitted by the projector 1, the control section 40 (data receiving section 405 and object display section 402) of the tablet terminal 4A controls the touch panel 43 so as to display the line L1 and the line L2 based on the received object data. Here, the touch panel 43 displays the same picture as the picture displayed on the screen SC (step S5). When display of the object is completed, the control section 40 obtains the order information of the maximum value in the received object data and transmits a request requesting the object data containing the order information that is a value greater than the obtained value to the projector 1 by controlling the communication section 45 (step S6). When the communication section 18 receives the request from the tablet terminal 4, the control section 10 suspends a response to the received request (step S7).

Operation Example when Generating Object in Projector 1 in State where Tablet Terminal 4A is Logged in Next, when the user moves the point body 3 while coming into contact with the screen SC and the control section 10 controls the drawing section 15 based on the moving trajectory of the point body 3, a line L3 is displayed in a position in which the point body 3 moves (FIG. 12) and the object data representing the line L3 is generated (step S8). Here, since the line L3 is the object that is generated third, the order information contained in the object data becomes "3".

When generating the object data, the control section 10 releases the suspension of the response performed in step S7 and transmits the object data of the generated line L3 as the response of the request of step S6 by controlling the communication section 18 to the tablet terminal 4A (step S9). When the communication section 45 receives the object data of the line L3 transmitted by the projector 1, the control section 40 of the tablet terminal 4A controls the touch panel 43 so as to display the line L3. Here, the touch panel 43 displays the same picture as the picture displayed on the screen SC (step S10). When the display of the object is completed, the control section 40 obtains the order information of the maximum value in the received object data and transmits the request requesting the object data containing the order information that is a value greater than the obtained value to the projector 1 by controlling the communication section 45 (step S11). The control section 40 that transmits the request waits for the response from the projector 1. Furthermore, when the communication section 18 receives the request transmitted from the tablet terminal 4A, the control section 10 suspends the response to the received request (step S12).

Operation Example when Generating Object in Tablet Terminal 4A

Next, when the user of the tablet terminal 4A moves the stylus pen while coming into contact with the touch panel 43 after touching the position of the icon IC1 that is in the picture displayed on the touch panel 43 with the stylus pen, the control section 40 (coordinate obtaining section 400) of the tablet terminal 4A specifies the moving trajectory of the stylus pen on the touch panel 43. When the control section 40 (object display section 402) controls the touch panel 43 based on the specified moving trajectory, the touch panel 43 draws a line L4 in a position in which the stylus pen is moved (step S13). When the drawing of the line L4 is completed, the control section 40 (object generation section 401) generates the object data of the line L4 (step S14) and transmits the generated object data to the projector 1 by controlling the communication section 45 (step S15). The generated object data corresponds to a second object data. Moreover, the order information does not contain the object data generated by the control section 40.

When the communication section 18 receives the object data transmitted from the tablet terminal 4A, the control section 10 controls the drawing section 15 based on the received object data. Here, the same picture (FIG. 13) as the picture displayed on the tablet terminal 4A is displayed on the screen SC (step S16). When the drawing of the object is completed, the control section 10 adds the order information to the object of the line L4 (step S17). Here, since the line L4 is the object that is generated fourth, the order information contained in the object data becomes "4". The object data to which the order information is added corresponds to third object data.

When the order information is added to the received object data, the control section 10 releases the suspension of the response performed in step S12 and transmits the object data of the line L4 to which the order information is added to the tablet terminal 4A as the response of the request of step S11 (step S18). When the communication section 45 receives the object data transmitted by the projector 1, the control section 40 of the tablet terminal 4A controls the touch panel 43 so as to display the line L4. Here, the touch panel 43 displays the same picture as the picture displayed on the screen SC (step S19). When the display of the object is completed, the control section 40 obtains the order information of the maximum value in the received object data and transmits the request requesting the object data containing the order information that is a value greater than the obtained value to the projector 1 by controlling the communication section 45 (step S20). When the communication section 18 receives the request transmitted from the tablet terminal 4A, the control section 10 suspends the response to the received request (step S21).

Operation Example when Tablet Terminal 4B is Logged in

Next, in the tablet terminal 4B in which the program of the Web browser is executed, when the user performs an operation to access the projector 1 with the touch panel 43, the tablet terminal 4B and the projector 1 communicate with each other and a page for logging in to the projector 1 is displayed on the touch panel 43. When the user inputs the user identifier and the password into the displayed page and performs an operation to transmit the user identifier and the password to the projector 1, the control section 40 transmits the input user identifier and the password to the projector 1 by controlling the communication section 45 (step S22). When the communication section 18 receives the transmitted identifier and the password, the control section 10 controls the communication section 18 and transmits the data of the Web page of the projected picture to the tablet terminal 4B when a set of the received user identifier and the password is stored in the storage section 12 (step S23).

When the communication section 45 receives the data of the Web page transmitted by the projector 1, the control section 40 of the tablet terminal 42 transmits a message requesting the object data of an entire object according to the Web page to the projector 1 by controlling the communication section 45 (step S3). When the communication section 18 receives the message, the control section 10 transmits the object data of the displayed line L1 to the line L4 to the tablet terminal 4B by controlling the communication section 18 (step S25).

When the communication section 45 receives the object data transmitted by the projector 1, the control section 40 of the tablet terminal 4B controls the touch panel 43 based on the received object data so as to display the line L1 to the line L4. Here, the touch panel 43 displays the same picture as the picture displayed on the screen SC (step S26). When the display of the object is completed, the control section 40 obtains the order information of the maximum value in the received object data and transmits the request requesting the object data containing the order information that is a value greater than the obtained value to the projector 1 by controlling the communication section 45 (step S27).

When the communication section 18 receives the request from the tablet terminal 43, the control section 10 suspends the response to the received request (step S28).

Operation Example when Generating Object in Tablet Terminal 4B

Next, when the user of the tablet terminal 4A moves the stylus pen while coming into contact with the touch panel 43, after touching the position of the icon IC1 that is in the picture displayed on the touch panel 43 with the stylus pen, the control section 40 (coordinate obtaining section 400) of the tablet terminal 4B specifies the moving trajectory of the stylus pen on the touch panel 43. When the control section 40 controls the touch panel 43 based on the specified moving trajectory, the touch panel 43 draws a line L5 in a position in which the stylus pen moves (step S29). When the drawing of the line L5 is completed, the control section 40 generates the object data of the line L5 (step S30) and transmits the generated object data to the projector 1 by controlling the communication section 45 (step S31). The generated object data also corresponds to the second object data. Moreover, the order information is not contained in the object data generated by the control section 40.

When the communication section 18 receives the object data transmitted from the tablet terminal 4B, the control section 10 controls the drawing section 15 based on the received object data. Here, the picture (FIG. 14) same as the picture displayed on the tablet terminal 42 is displayed on the screen SC (step S32). When the drawing of the object is completed, the control section 10 adds the order information to the object of the line L5 (step S33). Here, since the line L5 is the object that is generated fifth, the order information contained in the object data becomes "5". The object data to which the order information is added also corresponds to the third object data.

When the order information is added to the received object data, the control section 10 releases the suspension of the response performed in step S21 and step S28. The control section 10 transmits the object data of the line L5 to which the order information is added to the tablet terminal 4A as the response to the request of step S20 (step S34) and transmits the object data of the line L5 to which the order information is added to the tablet terminal 4B as the response to the request of step 327 (step S35).

When the communication section 18 receives the object data transmitted by the projector 1, the control section 40 of the tablet terminal 4A and the tablet terminal 4B controls the touch panel 43 so as to display the line L5. Here, the touch panel 43 displays the picture same as the picture displayed on the screen SC (step S36 and step S37). When the display of the object is completed, the control section 40 of the tablet terminal 4A and the tablet terminal 4B obtains the order information of the maximum value in the received object data and transmits the request requesting the object data containing the order information that is a value greater than the obtained value to the projector 1 by controlling the communication section 45 (step S38 and step S39). When the communication section 18 receives the request from the tablet terminals 4A and 4B, the control section 10 suspends the response to the received request (step S40).

Operation Example when Erasing Object

Figure 14:
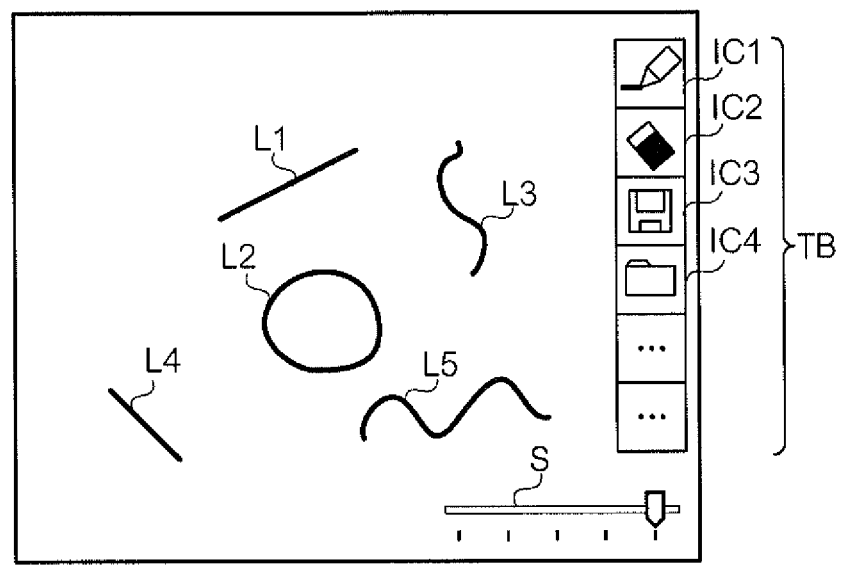
FIG. 14 is a view illustrating a picture example projected on a screen.

Next, an operation example when erasing the displayed object will be described. In a state where the picture illustrated in FIG. 14 is displayed, when the user touches the position of the icon IC2 with the point body 3, the projector 1 is in a state where the object can be erased with the point body 3.

When the user makes the point body 3 come into contact with the screen SC, the image sensor 16 obtains the light emitted by the point body 3. The control section 10 (coordinate obtaining section 100) analyzes the image data supplied from the image sensor 16, specifies the position of the light emitted by the point body 3, and obtains the position of the point body 3 on the screen SC. When the object is in a specified position, the control section 10 controls the drawing section 15 and erases the object displayed in the position of the point body 3 (step S41) and generates the object data (step S42).

Figure 15:
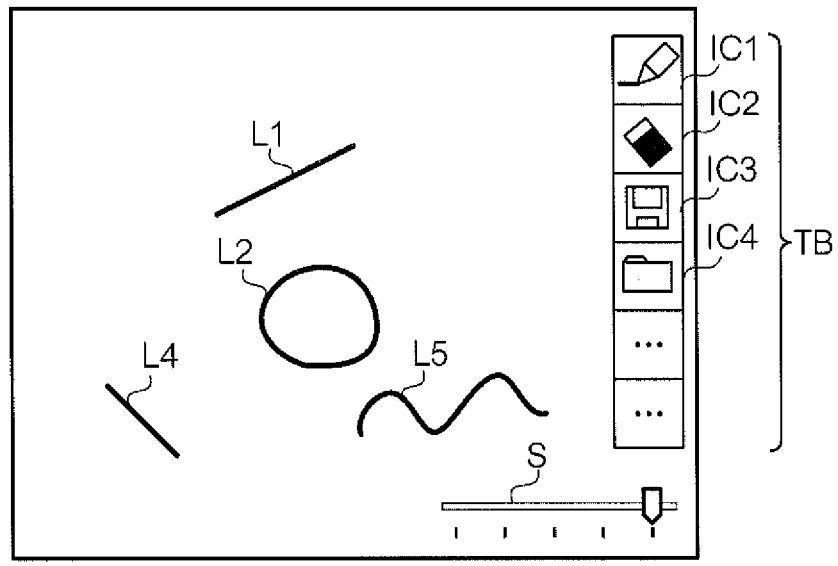
FIG. 15 is a view illustrating a picture example projected on a screen.

For example, when the user moves the point body 3 to the position of the line L3, the line L3 is erased and, as illustrated in FIG. 15, the screen SC is in a state where the line L1, the line L2, the line L4, and the line L5 are displayed. Moreover, the object data erasing the line L3 contains "3" that is the order information of the object data of the erased line L3. In addition, since the object data erasing the line L3 is the object data that is generated sixth, the order information contained in the object data becomes "6".

When generating the object data, the control section 10 releases the suspension of the response performed in step S40 and transmits the object data erasing the line 13 to the tablet terminal 4A and the tablet terminal 4B by controlling the communication section 18 as the response to the request of step S38 and step S39 (step S43 and step S44). When the communication section 45 receives the object data transmitted by the projector 1, the control section 40 of the tablet terminal 4A and the tablet terminal 4B controls the touch panel 43 so as to erase the line L3 (step S45 and step S46). Here, the touch panel 43 displays the picture same as the picture displayed on the screen SC. When the erasing of the object is completed, the control section 40 of the tablet terminal 4A and the tablet terminal 4B obtains the order information of the maximum value in the received object data and transmits the request requesting the object data containing the order information that is a value greater than the obtained value to the projector 1 by controlling the communication section 45 (step S47 and step S48).

Operation Example when Operating Slider S

Next, an operation when the user operates the slider S will be described. For example, in a state where the knob of the slider S is in the right end, when the user positions the point body 3 at the position of the knob of the slider S and then moves the point body 3 by one step of the scale of the slider S to the left along an axial direction of the slider S, the control section 10 displays the knob of the slider S at a position which is moved by one step to the left. Furthermore, the control section 10 obtains the order information of the maximum value from the object data and subtracts a value of the step of moving the knob of the slider S from the obtained value. For example, as described above, when moving the knob of the slider S by one step to the left from a state where the line L3 is erased, since the maximum value of the order information is "6" of the object data erasing the line L3, it is 6−1=5.

Figure 16:
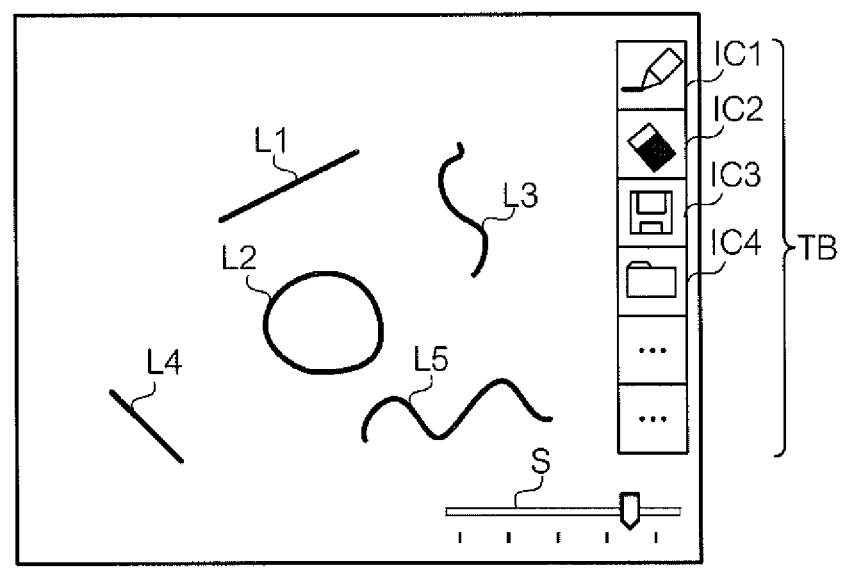
FIG. 16 is a view illustrating a picture example projected on a screen.

The control section 10 controls the drawing section 15 and performs re-drawing of the picture projected on the screen SC, based on the order information being 1 of the object data to the object data of the value of the order information that is obtained by the calculation described above. Here, when the value obtained by the calculation as described above is 5, the re-drawing of the picture projected on the screen SC is performed, based on the object data from the order information being 1 to the order information being 5. Since the object data from the order information being 1 to the order information being 5 is the object data from the line L1 to the line L5, as illustrated in FIG. 16, the picture projected on the screen SC becomes the picture before the line L3 is erased.

Moreover, when an operation touching the icon of the toolbar TB is performed after the knob of the slider S is moved from the right end, the control section 10 returns the knob of the slider S to the right end and returns the picture to a state before the slider S is operated. Furthermore, when an operation moving the knob of the slider S is performed on the tablet terminal 4, the tablet terminal 4 performs the re-drawing of the picture displayed on the touch panel 43 similar to the projector 1.

As described above, according to the embodiment, when additional writing of the object is performed, the object data of the additionally written object is transmitted to the tablet terminal 4 and the image of the tablet terminal 4 is updated. According to the embodiment, since the picture can be updated without transmitting all data according to the displayed picture, it is possible to reduce information quantity of the communication.

Furthermore, according to the embodiment, since the display of the object is performed based on the object data, it is possible to return or advance the display of the object to the position where the user desires by object unit. Furthermore, since the display is performed by object unit, it is possible to integrate the objects drawn by a plurality of tablet terminals 4 and to share a common picture in a plurality of apparatuses.

Second Embodiment

Next, a second embodiment of the invention will be described. A display system PS1 according to the second embodiment is configured of the same apparatus as that of the first embodiment. In the embodiment, configurations of a projector 1 and a tablet terminal 4 are different from those of the first embodiment. In the following description, the description of the same configuration as the first embodiment will be omitted and differences from the first embodiment will be described below.

Figure 17:
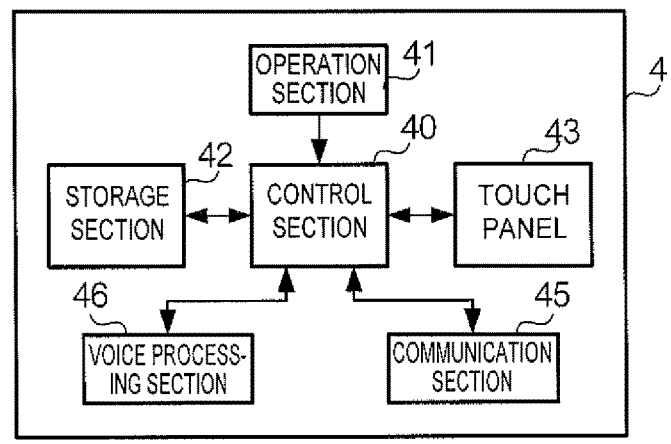
FIG. 17 is a view illustrating a hardware configuration of a tablet terminal according to a second embodiment.

FIG. 17 is a view illustrating a hardware configuration of the tablet terminal 4 according to the second embodiment. The tablet terminal 4 according to the embodiment has a voice processing section 46. The voice processing section 46 has a microphone and a speaker. The voice processing section 46 converts voice data representing voice into an analog signal. The analog signal is supplied to the speaker and the voice is emitted in response to the analog signal from the speaker. Furthermore, the voice processing section 46 converts the voice received by the microphone into a digital signal and has a function for generating the voice data representing the received voice. That is, the voice processing section 46 is an example of a voice data generating unit generating the voice data.

Figure 18:
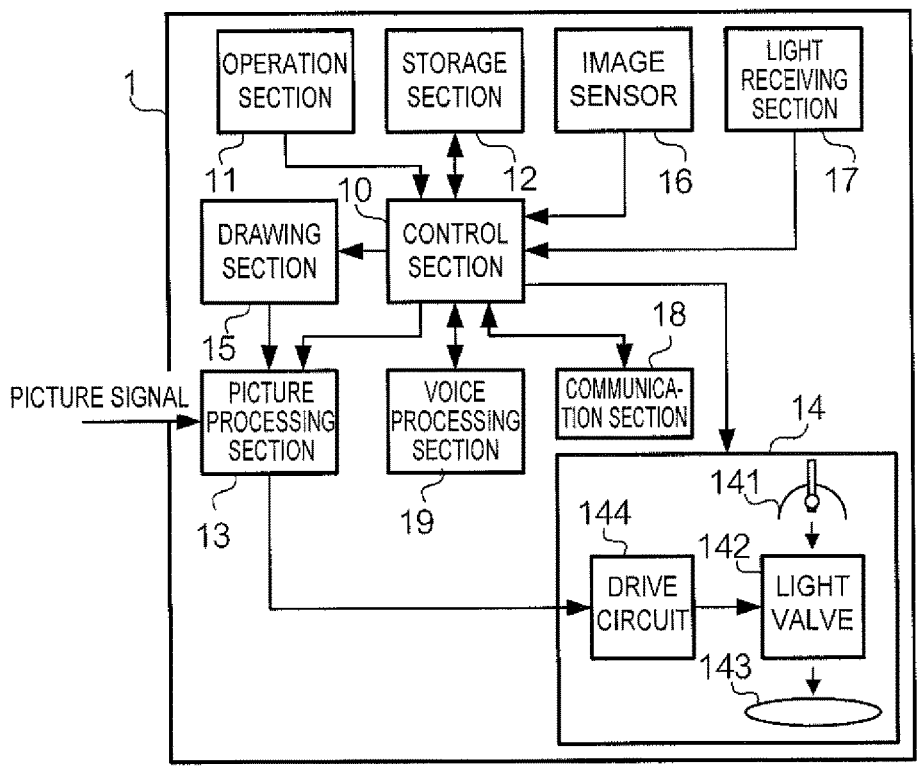
FIG. 18 is a view illustrating a hardware configuration of a projector according to the second embodiment.

FIG. 18 is a view illustrating a hardware configuration of the projector 1 according to the second embodiment. The projector 1 according to the embodiment has a voice processing section 19. The voice processing section 19 has a microphone and a speaker. The voice processing section 19 converts the voice data representing the voice into the analog signal. The analog signal is supplied to the speaker and the voice is emitted in response to the analog signal from the speaker. Furthermore, the voice processing section 19 converts the voice received by the microphone into the digital signal and has the function for generating the voice data representing the received voice. The voice data is stored in the storage section 12.

In the embodiment, when the user operates to instruct start of the whiteboard function in the controller RC, the control section 10 stores the voice data representing the voice received by the microphone in the storage section 12. Furthermore, the control section 10 measures an elapsed time from the start of the storage of the voice data and contains an elapsed time measured when generating the object data in the object data when generating the object data. Moreover, since a value of the elapsed time is increased as the object data is generated later, it is possible to obtain the order in which the object data is generated from the elapsed time of each object data. Thus, the elapsed time can be an example of the order information.

In the projector 1, when performing the operation to move the knob of the slider S, the control section 10 reproduces the stored voice data in response to the position of the knob. For example, as described in the first embodiment, when moving the knob of the slider S to the left by one step in the state of FIG. 15, the control section 10 obtains the order information of the maximum value in the object data and subtracts the value of the step of moving of the knob of the slider S from the obtained value. Here, since the maximum value of the order information is "6" of the object data erasing the line L3, a calculation result is 6−1=5. The control section 10 specifies the object data containing 5 of the calculation result as the order information and obtains the elapsed time contained in the specified object data. When obtaining the elapsed time, the control section 10 obtains the voice data subsequent to the obtained elapsed time from the storage section 12 and transmits the voice data to the voice processing section 19. The voice processing section 19 emits the voice represented by the transmitted voice data from the speaker. According to the configuration, since the voice when additionally writing the object in the past is reproduced, it is possible to easily obtain contents of conversation when additionally writing the object.

Furthermore, in the tablet terminal 4, when the operation to move the knob of the slider S is performed, the control section 40 reproduces the voice data stored in the projector 1. For example, in the tablet terminal 4A, when moving the knob of the slider S to the left by one step from the state of FIG. 15, the control section 40 obtains the order information of the maximum value in the object data and subtracts the value of the step of moving the knob of the slider S from the obtained value. Here, since the maximum value of the order information is "6" of the object data erasing the line L3, the calculation result is 6−1=5. The control section 40 specifies the object data containing 5 of the calculation result as the order information and obtains the elapsed time contained in the specified object data.

The control section 40 transmits a message requesting the elapsed time and the voice data subsequent to the obtained elapsed time to the projector 1 by controlling the communication section 45. The projector 1 that obtains the message obtains the voice data subsequent to the elapsed time contained in the obtained message from the storage section 12 and transmits the obtained voice data to the tablet terminal 4 by controlling the communication section 18. The control section 40 of the tablet terminal 4 transmits the transmitted voice data to the voice processing section 46. The voice processing section 46 emits the voice represented by the transmitted voice data from the speaker. According to the configuration, since the voice when additionally writing the object in the past is reproduced in the tablet terminal 4, it is possible to easily obtain the contents of the conversation when additionally writing the object.

Moreover, in a case of a configuration of storing the voice data, the voice data generated from the voice received by the tablet terminal is transmitted to the projector 1 and the voice data generated by the projector 1 and the voice data generated by the tablet terminal may be combined.

Furthermore, in the configuration described above, the configuration is provided in which the elapsed time is contained in the object data, but it is possible to contain the date and time when the object data is generated. In this configuration, the projector 1 or the tablet terminal 4 obtains the date and time contained in the object data and reproduces the voice data subsequent to the obtained elapsed time. Here, since the order generated by the object data can be obtained from the date and time contained in each object data, the date and time can be an example of the order information.

Modification Examples

The above describes the embodiments of the invention, but the invention is not limited to the embodiments described above and the invention may be performed by various other forms. For example, it is possible to implement the invention by modifying the embodiments described above as follows. Moreover, the embodiments described above and modification examples described below may be combined with each other.

In the embodiments described above, when performing the operation to move the knob of the slider S in any one of the projector 1, the tablet terminal 4A, and the tablet terminal 4B, the picture may be displayed in response to the position of the moved knob even in the devices other than the device in which the knob is moved.

For example, in the projector 1, when performing the operation to move the knob of the slider S, the projector 1 transmits from the object data in which the order information is 1 to the object data corresponding to the position of the knob to the tablet terminals 4A and 4B. The tablet terminals 4A and 4B to which the object data is transmitted perform the update of the object displayed in the touch panel 43 based on the transmitted object data.

Furthermore, in the tablet terminal 4, when performing the operation to move the knob of the slider S, the tablet terminal 4 in which the operation to move the knob is performed requests from the object data in which the order information is 1 to the object data corresponding to the position of the knob to the projector 1. The request contains the order information. The projector 1 transmits the object data corresponding to the requested order information to the tablet terminals 4A and 4B, based on the request received by the data receiving section 105 from the tablet terminal 4. The tablet terminals 4A and 4B to which the object data is transmitted perform the update of the object displayed in the touch panel 43, based on the transmitted object data. Furthermore, the projector 1 updates the projected picture, based on the requested object data.

According to the modification example, the pictures displayed in the projector 1 and in the tablet terminal 4 can be same as each other.

In the second embodiment described above, the voice data is reproduced in response to the operation of the slider S, but the configuration reproducing the voice data is not limited to the configuration of the second embodiment. For example, when the operation to touch the object is performed by the point body 3 or the stylus pen after the operation to touch the icon of the toolbar TB is performed by the point body 3 or the stylus pen, the elapsed time contained in the object data is obtained from the object data of the object to which the point body 3 or the stylus pen is touched and the voice may be emitted based on the voice data subsequent to the obtained elapsed time. Furthermore, in this configuration, the elapsed time contained in the object data is obtained from the object data of the object to which the point body 3 or the stylus pen is touched, the object data containing the elapsed time before the obtained elapsed time is specified, and the displayed picture may be updated, based on the specified object data. Furthermore, when the operation is performed by the tablet terminal 4, the object data containing the elapsed time before the obtained elapsed time is requested to the projector 1, the projector 1 transmits the requested object data to the tablet terminal 4, and the tablet terminal 4 may update the display of the touch panel 43 based on the transmitted object data.

In the embodiments described above, when displaying the state where the object is generated in response to the operation of the slider S, the following configuration may be provided. In the modification example, the left end of the slider S represents a time point at which the initial object is generated and the right end of the slider S represents a time point at which the latest object is generated.

In the projector 1, when performing the operation to move the knob of the slider S, the control section 10 obtains the elapsed time from the time point at which the initial object is generated to the time point corresponding to the position of the knob. The control section 10 specifies the object data containing the elapsed time before the obtained elapsed time and updates the projected picture, based on the specified object data.

Furthermore, in the tablet terminal 4, when performing the operation to move the knob of the slider S, the control section 40 obtains the elapsed time from the time point at which the initial object is generated to the time point corresponding to the position of the knob. The control section 40 specifies the object data containing the elapsed time before the obtained elapsed time and updates the picture displayed on the touch panel 43, based on the specified object data. Moreover, the tablet terminal 4 may request the object data containing the elapsed time before the obtained elapsed time to the projector 1. In this configuration, the projector 1 transmits the requested object data to the tablet terminal 4 and the tablet terminal 4 updates the display of the touch panel 43 based on the transmitted object data.

Also in the modification example, it is possible to return or advance the display of the object.

In the embodiments described above, as an example of the display apparatus, the front projection type projector 1 is described, but the display apparatus may be a rear projection type projector. Furthermore, in the projector 1, the light valve is not limited to one using the liquid crystal and, for example, may be configured by using a digital mirror device. Furthermore, the display apparatus according to the invention is not limited to the projector 1 as long as the apparatus displays the picture and may be a direct-view type display apparatus. Moreover, as the direct-view type display apparatus, a liquid crystal display apparatus, a display apparatus using a Cathode Ray Tube (CRT), a plasma display apparatus, an organic EL display apparatus, and the like may be included. Furthermore, a smartphone or a personal computer may be used instead of the tablet terminal and may be a projector equipped with the whiteboard function. Furthermore, as a technology for sharing the display data between the projector and the tablet terminal, the invention is described by using the technology of the Web page and the Web browser, but the technology for sharing the display data is not limited to the embodiment and may be realized by various other methods. Furthermore, as the drawing unit for drawing the object on the screen SC, the invention is described by the example using the point body 3, but the input unit for inputting the coordinates on the screen SC is not limited to the embodiment and may employ a method using the fingers of the user, and may employ using the controller RC. Furthermore, the input unit may employ a method using light of a laser pointer. That is, the fingers of the user, the controller RC, or the light of the laser pointer is also an example of the point body.

What is claimed is:

1. A display apparatus comprising:
a display unit;
an obtaining unit that obtains coordinates on a display region of the display unit;
a drawing unit that draws an image representing an object;
an object display unit that controls the drawing unit so as to display the object in a position of the coordinates;
a generating unit that generates object data representing the object;
a data transmitting unit that transmits the object data generated by the generating unit to a client; and
a script transmitting unit that transmits a script for obtaining the object data to the client.

2. The display apparatus according to claim 1, further comprising:
a receiving unit that receives second object data of a second object that is generated and transmitted by the client,
wherein the drawing unit draws a second image representing the second object,
the object display unit controls the drawing unit so as to display the second object,
the generating unit generates third object data in which order information is added to the received second object data, and
the script transmitting unit transmits the script to obtain the object data including the third object data.

3. The display apparatus according to claim 2,
wherein the receiving unit receives the order information transmitted by the client, and
the data transmitting unit transmits to the client the object data including the object data generated first and the object data corresponding to an order represented by the order information.

4. The display apparatus according to claim 3,
wherein the order information is specified in a slider-type user interface displayed on a display unit of the client.

5. The display apparatus according to claim 3,
wherein the order information is included in an object specified by a user among objects corresponding to the object data which are transmitted by the data transmitting unit and displayed on a display unit of the client.

6. The display apparatus according to claim 3, further comprising:
a voice data generating unit that generates voice data representing received voice,
wherein the data transmitting unit transmits to the client the voice data subsequent to a time point at which the object data corresponding to the order represented by the order information is generated among the voice data.

7. The display apparatus according to claim 1, wherein the object is drawn using a point body on the display region of the display unit.

8. The display apparatus according to claim 1, wherein the drawing unit draws an image of a menu item for controlling the display apparatus, and the display unit displays the image of the menu item.

9. A display system comprising:
a display apparatus, including:
a display unit;
an obtaining unit that obtains coordinates on a display region of the display unit;
a drawing unit that draws an image representing an object;
an object display unit that controls the drawing unit so as to display the object in a position of the coordinates; and
a generating unit that generates object data representing the object; and
a client, including:
a script receiving unit that receives a script for obtaining the object data;
a script execution unit that executes the script;
a data receiving unit that receives the object data; and
a display control unit that controls a display unit included in the client based on the object data so as to display the object,
wherein the display apparatus further includes:
a data transmitting unit that transmits the object data generated by the generating unit to the client, and
a script transmitting unit that transmits the script to the client.

10. The display system according to claim 9, wherein:
the client further includes:
a second object data generating unit that generates second object data of a second object, and
a second object data transmitting unit that transmits the second object data to the display apparatus, and the display apparatus further includes a receiving unit that receives the second object data, the generating unit generates third object data in which order information is added to the received second object data, and the script transmitting unit transmits the script to obtain the object data including the third object data.

11. A display method comprising:

obtaining coordinates on a display region of a display unit;

drawing an image representing an object;

displaying the object in a position of the coordinates;

generating object data representing the object;

transmitting the object data to a client;

transmitting a script for obtaining the object data to the client;

receiving the script;

executing the script;

receiving the object data; and controlling a display unit included in the client based on the object data so as to display the object.

12. The display method according to claim 11, further comprising:

receiving second object data that is generated and transmitted by the client; and displaying the received second object data, wherein in the generating of the object data, order information is added to the received second object data, and in the transmitting of the script, the script transmitted is to obtain object data including the order information added to the second object data.

* * * * *